(12) United States Patent
Albiez

(10) Patent No.: US 11,766,987 B2
(45) Date of Patent: Sep. 26, 2023

(54) OPW AIRBAG

(71) Applicant: Global Safety Textiles GmbH, Bad Säckingen (DE)

(72) Inventor: Daniel Albiez, Murg (DE)

(73) Assignee: GLOBAL SAFETY TEXTILES GMBH, Maulburg (DE)

( * ) Notice: Subject to any disclaimer, the term of this patent is extended or adjusted under 35 U.S.C. 154(b) by 270 days.

(21) Appl. No.: 17/208,582

(22) Filed: Mar. 22, 2021

(65) Prior Publication Data

US 2021/0300291 A1    Sep. 30, 2021

(30) Foreign Application Priority Data

Mar. 26, 2020    (DE) ...................... 10 2020 108 400.5

(51) Int. Cl.
| | | |
|---|---|---|
| *B60R 21/235* | (2006.01) | |
| *B60R 21/2338* | (2011.01) | |
| *D03D 1/02* | (2006.01) | |
| *D03D 11/00* | (2006.01) | |
| *D03D 11/02* | (2006.01) | |

(52) U.S. Cl.
CPC ........ *B60R 21/235* (2013.01); *B60R 21/2338* (2013.01); *D03D 1/02* (2013.01); *D03D 11/00* (2013.01); *D03D 11/02* (2013.01); *B60R 2021/23382* (2013.01); *B60R 2021/23547* (2013.01); *D10B 2505/124* (2013.01)

(58) Field of Classification Search
None
See application file for complete search history.

(56) References Cited

U.S. PATENT DOCUMENTS

| | | |
|---|---|---|
| 6,296,276 B1 | 10/2001 | Ritter |
| 6,398,253 B1 | 6/2002 | Heigl |
| 10,525,927 B2 | 1/2020 | Fischer et al. |

FOREIGN PATENT DOCUMENTS

| | | |
|---|---|---|
| DE | 20015134 U1 | 1/2001 |
| DE | 102019002441 A1 | 10/2020 |
| EP | 3127758 A1 | 2/2017 |
| WO | 2020201018 A1 | 10/2020 |

OTHER PUBLICATIONS

EURO NCAP: Far side occupant test & assessment procedure. Version 1.0. Leuven, Belgien, 2017. 22 S. URL: https://cdn.euroncap.com/media/32284/euro-cap-far-side-test-and-assessment-protocol-v1 O.pdf (abgerufen am Jul. 24, 2019).

*Primary Examiner* — Shawn Mckinnon
(74) *Attorney, Agent, or Firm* — Pearne & Gordon LLP

(57) ABSTRACT

An OPW airbag has warp and weft threads woven together in a lower fabric layer, an upper fabric layer and a middle fabric layer arranged therebetween. The airbag has, arranged along a longitudinal axis, front, middle and rear portions. A generator mouth and an inflow region are in the front portion. Upper and lower main chambers are in the middle portion. A first plurality of lower stiffening chambers is in the rear portion between the middle and lower fabric layers. A second plurality of upper stiffening chambers is in the rear portion between the middle and upper fabric layers. At least one upper stiffening chamber, which is narrower compared to the lower stiffening chamber, is associated with each lower stiffening chamber. The lower stiffening chambers are each spaced apart by lower woven seams. Bridge chambers, which cover the lower woven seams, are arranged between the middle and upper fabric layers.

8 Claims, 7 Drawing Sheets

OPW AIRBAG

The present invention relates to a one-piece woven (OPW) airbag having at least three woven fabric layers, a lower fabric layer, an upper fabric layer and a middle fabric layer arranged therebetween.

So-called far-side airbags, also known as front-center airbags, are arranged, for example, in the driver's seat of motor vehicles on the side directed towards the front passenger. These airbags are to be used in the future to meet the new Euro NCAP test requirements expected to come into force in 2020. Test descriptions for this can be found on the Internet, for example, under "euro-ncap-far-side-test-and-assessment-protocol-v10.pdf". See also "European New Car Assessment Programme" at www.euroncap.com.

Previously, it has only been possible to produce the airbags referred to above using the very complex cut, seal & sew process. A large number of woven fabric pieces are cut from one fabric length or a plurality of fabric lengths, coated with a sealing compound and sewn together to form airbags in an expensive and time-consuming process. So as to ensure the best possible protection for the vehicle occupants, such an airbag must have a distinct shape and very high stiffness when inflated. Known airbags for this purpose represent complex solutions and are currently produced with a high level of making-up effort, for example by cutting out two or more identical or partially identical or different production parts from a flat silicone-coated woven fabric, spraying on a sealing compound, e.g. in the form of a peripheral bead, at the edge and then placing the two or more fabric parts on top of each other, as well as then adhesively bonding the parts together. In addition, the fabric layers are sewn to ensure sufficient strength of the adhesive seam. Further components, e.g. rebound straps, straps, etc. have to be sewn on in a further process step for shaping (with or without sealing compound). The process is very time- and cost-intensive and requires a large number of manual process steps. However, the installation space available for the complete module in the vehicle seat is very limited. Sewn far-side airbags require more space as the seams and several layers of fabric make them very bulky.

EP 3 127 758 A1 discloses a far-side airbag apparatus which has a two-layer airbag that is sewn multiple times, in whose interior various pieces of specifically dimensioned and positioned material are sewn parallel to the outer layers of the otherwise two-layer airbag for controlling the spatial structure desired during inflation. In addition, specific connecting seams are created to connect the two outer fabric layers. The patent description details the laborious and time-consuming production of far-side airbags.

The German utility model specification DE 200 15 134 U1 describes a head-side airbag protection device having an airbag with two fabric layers which are joined together by spacers, the spacers limiting the distance between the fabric layers in the inflated state. The spacers consist of warp and weft threads which in each case emerge locally in so-called regions 61 in predetermined regions from one of the two fabric layers and, after interweaving with warp and weft threads extending from the other opposing fabric layer, run back into their original fabric layer or into the opposing fabric layer. The protection device described here is characterized by the spacers described but leaves a lot to be desired in terms of stiffness in the inflated state.

U.S. Pat. No. 10,525,927 B2 discloses a device for the protection of a vehicle occupant which has at its core an airbag that is U-shaped in the inflated state, which in the deployment case expands into the lap area of the vehicle occupant, its maximum expansion in the direction of the vehicle occupant being limited by one or a plurality of anchoring devices or tethers so as not to injure the vehicle occupant. The airbag is inflated into a preconfigured U-shaped final shape. The final shape is created, as described in detail therein, by sewing or welding pieces of fabric together in an extremely complex manner. This device is in no way suitable for helping in a far-side deployment case.

It is thus an object of the invention to propose an airbag which now avoids or at least greatly diminishes the known disadvantages in prior art.

The object is achieved with an OPW airbag according to claim 1, namely an

OPW airbag having warp threads and weft threads, which are woven together in at least three woven fabric layers, a lower fabric layer, an upper fabric layer and a middle fabric layer arranged therebetween, wherein a) the OPW airbag, arranged along a longitudinal axis, has a front portion, a middle portion and a rear portion, b) preferably a generator mouth for receiving a generator and adjacent thereto an inflow region are arranged in the front portion, c) an upper main chamber and a lower main chamber are arranged in the middle portion, d) a first plurality of lower stiffening chambers extending along the longitudinal axis and transversely thereto is arranged in the rear portion between the middle fabric layer and the lower fabric layer, d) a second plurality of upper stiffening chambers extending transversely along the longitudinal axis is arranged in the rear portion between the middle fabric layer and the upper fabric layer, f) at least one upper stiffening chamber, which is narrower compared to the lower stiffening chamber, is associated with each lower stiffening chamber, g) the lower stiffening chambers are each spaced apart by lower woven seams, h) bridge chambers, which cover the lower woven seams, are arranged between the middle fabric layer and the upper fabric layer.

With the advantageous embodiment of the OPW airbag according to the invention, it is advantageously possible in the inflated state to absorb considerable forces of a head of a vehicle occupant moving sideways, for example as a result of a crash. This cost-saving advantage emerges without the OPW airbag being equipped with additional anchoring or fixing straps, such as are present on airbags known in prior art. They have to be retrofitted on the making-up side following airbag production (woven as an OPW airbag or produced as a sewn airbag). During "weaving", the OPW airbag according to the invention is produced in a ready-to-use manner. On inflating the OPW airbag according to the invention, the rear portion expands into a cylindric shape which encloses a void quasi as a buffer zone or crumple zone. Via the chambers adjacent to them, the bridge chambers urge the rear portion into a curvature which results in the said cylindric shape. The rear end of the rear portion is supported on the middle portion. A further advantage when using the OPW airbag according to the invention emerges in that the volume reached as a buffer zone does not have to be filled completely with a medium (air or inflation gas). The interior of the cylindric shape remains empty. "Inflation volume" is "saved" and the protection device for the vehicle occupants is thus available more quickly.

In an advantageous embodiment, the OPW airbag is characterized in that three upper stiffening chambers are associated with one lower stiffening chamber in each case.

As a result of this advantageous arrangement, the outer shape of the roller is more uniform and at the same time better stiffened. Surprisingly, this arrangement has proven to be particularly advantageous.

In a further advantageous embodiment, the OPW airbag according to the invention is characterized in that in addition to the first plurality of lower stiffening chambers extending along the longitudinal axis and transversely thereto and the second plurality of upper stiffening chambers extending transversely to the longitudinal axis, further, preferably up to eight further, first and second pluralities of stiffening chambers are arranged along the longitudinal axis. Surprisingly, it has been shown that a larger number of shorter stiffening chambers arranged one behind the other across the width of the OPW airbag results in the OPW airbag molding more flexibly to the vehicle occupant than only one longer stiffening chamber.

In yet another advantageous embodiment, the OPW airbag according to the invention is characterized in that X-tether series (XTK), extending transverse and/or parallel to the longitudinal axis (LA), are arranged in selected regions in the middle portion (MA), between the middle fabric layer (MG) and the upper fabric layer (OG) and/or between the middle fabric layer (MG) and the lower fabric layer (UG).

This configuration according to the invention enables accurate control of the individually desirable shape of the upper and the lower main chamber. In the selected regions, in which two fabric layers are joined together via X-tethers, local expansion of the airbag and the extent thereof during inflation are intentionally restricted according to the invention.

In yet a further advantageous embodiment, the OPW airbag according to the invention is characterized in that at least one stiffening woven seam extending in the direction of the longitudinal axis is arranged in the middle portion, between the middle fabric layer and the upper fabric layer. By means of the longitudinally or transversely extending woven stiffening seam provided according to the invention, it is possible to form "harder" and less "hard" parts of the OPW airbag according to the invention in a targeted manner and thus to adjust the longitudinal and/or transverse stiffness, it being possible to also arrange the woven stiffening seam or seams in the OPW airbag independently of direction.

In a further advantageous embodiment, the OPW airbag according to the invention is characterized in that after inflation of the inflow region, the main chambers, the stiffening chambers and the bridge chambers, it curves in a circular shape, in particular above the generator mouth, the bridge chambers pushing away the adjacent upper stiffening chambers and the lower woven seams acting like hinges.

In a further advantageous embodiment, the OPW airbag according to the invention is characterized in that it is provided with a polymer layer on its outer surfaces. Coating with a sealing compound such as this advantageously increases the impermeability to air of the fabric layers and in turn the dimensional stability of the airbag under inflation pressure.

An advantageous method according to the invention for producing an OPW airbag on a jacquard loom according to one of claims 1 to 7 comprises the following steps:
a) preparing warp threads for an upper, a middle and a lower fabric layer,
b) weaving in weft threads to form an OPW airbag in a length of material,
c) cutting out the OPW airbag from the length of material.

Advantageously, with these few steps the OPW airbag according to the invention is produced ready-to-use without the need for other applications, possibly made of extraneous material.

In particular, the object of the present invention can be used in the far-side bag sector, as is required in the Euro NCAP 2020 guideline.

To facilitate better understanding of the invention, it will now be briefly described by way of an example embodiment with the aid of a drawing, in which: the figures show mainly highly schematic plan views or sectional views.

Figure 1:
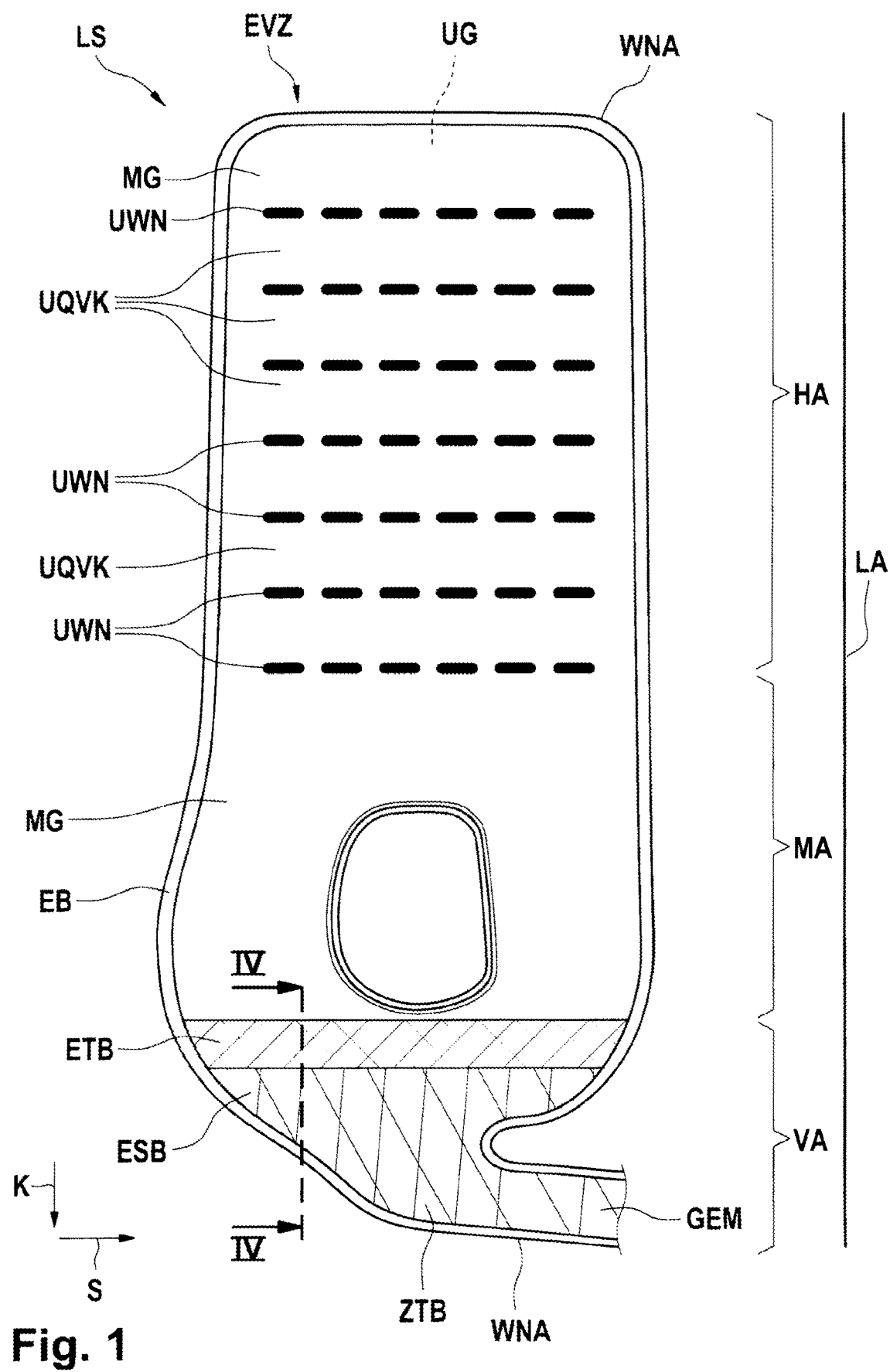
FIG. 1 shows a top view of a first embodiment of a lower and middle fabric layer of an OPW airbag according to the invention in the uninflated state, the upper fabric layer having been omitted for reasons of clarity.
Figure 2:
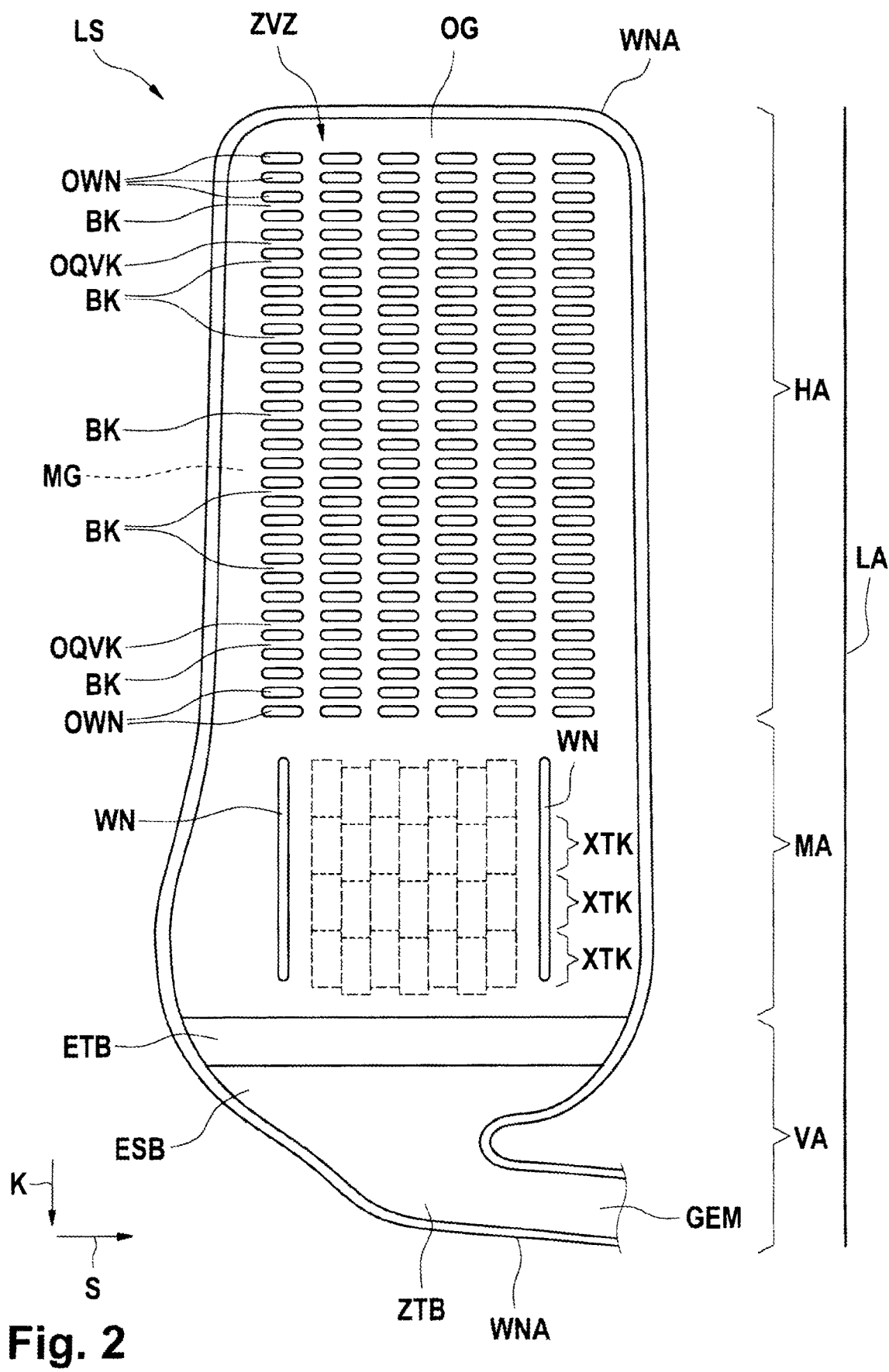
FIG. 2 shows a top view of the OPW airbag according to FIG. 1, the lower fabric layer having been omitted for reasons of clarity.
Figure 3:
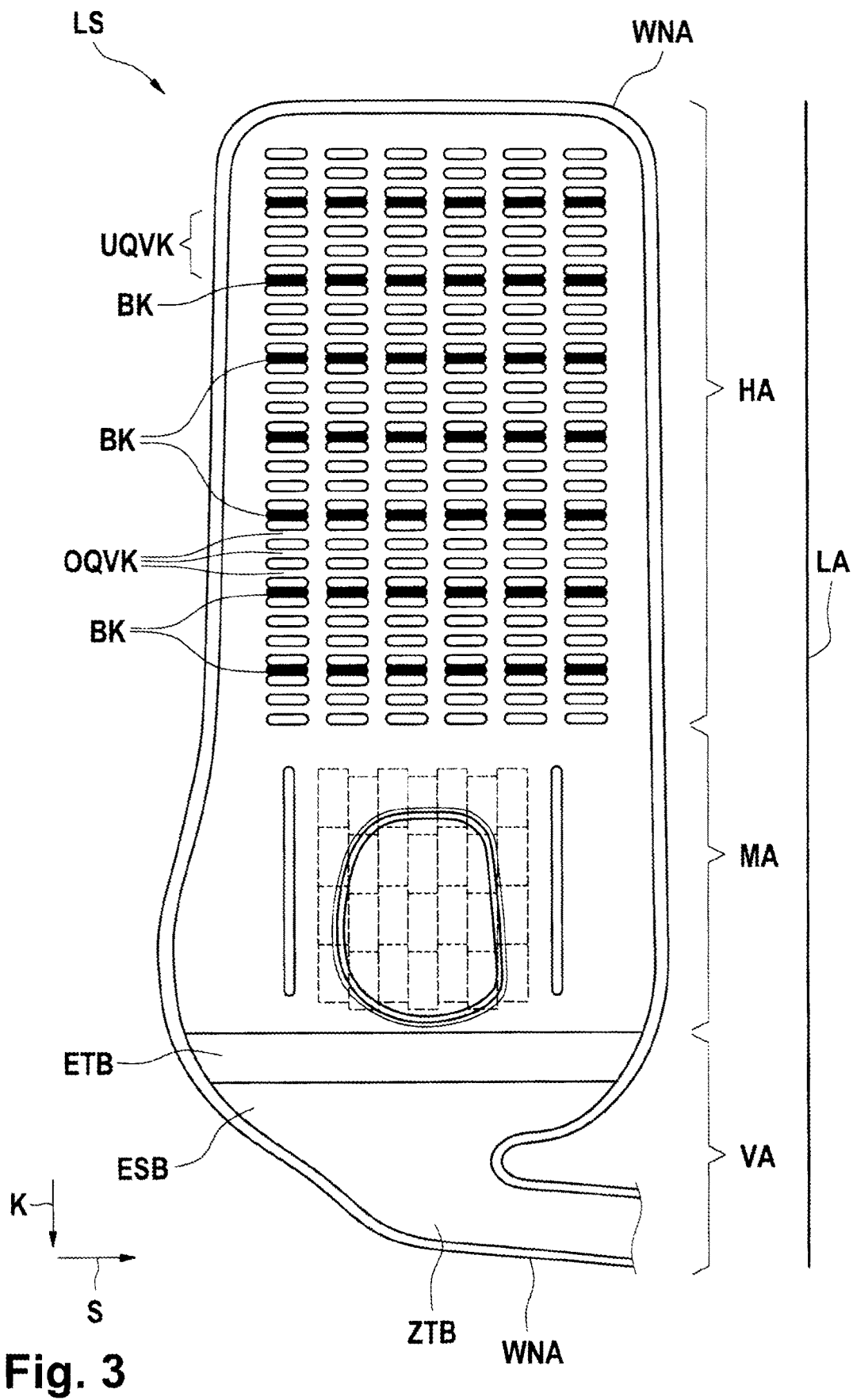

FIG. 3 finally shows a top view of the OPW airbag according to FIGS. 1 and 2, the woven seams and chambers of the two previous views being superimposed on each other for orientation.

Figure 4:
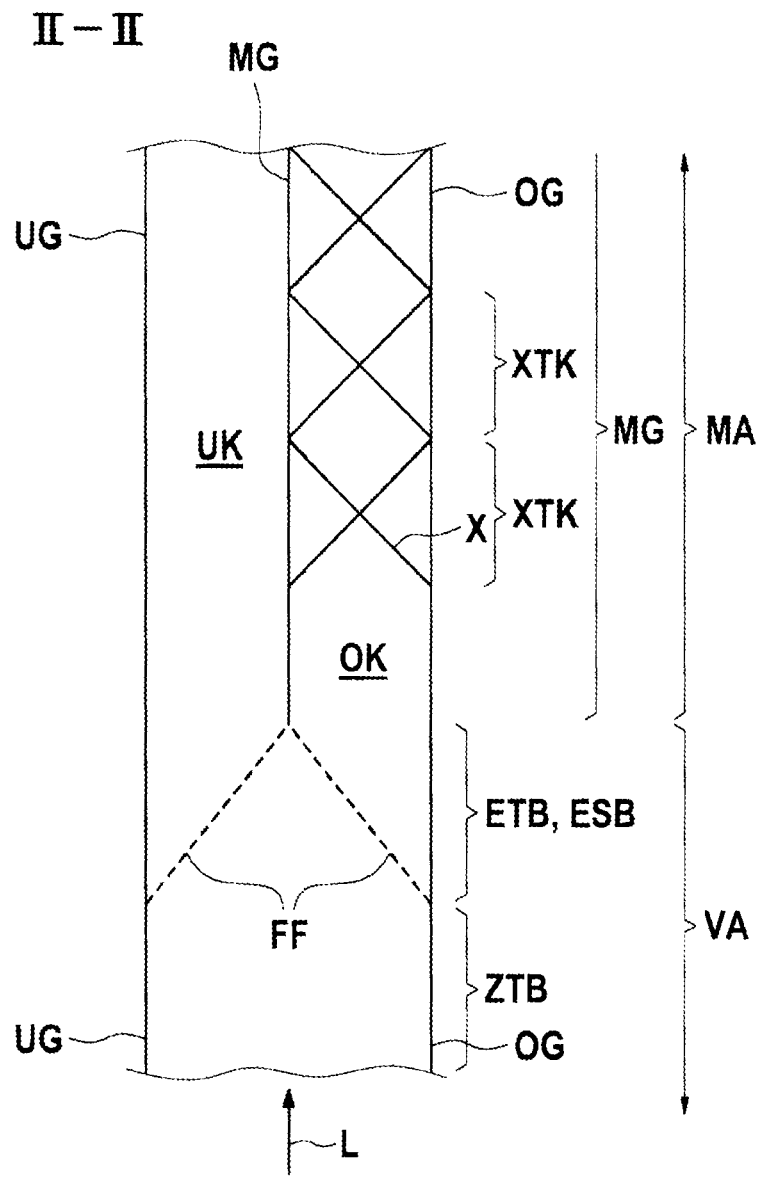

FIG. 4 is a highly simplified sectional view from FIG. 1 in the uninflated state, where completely floating warp threads of the middle fabric layer are shown in a first partial region of the OPW airbag and X-tethers arranged in a series are shown in an upper main chamber in a middle portion.

Figure 5:
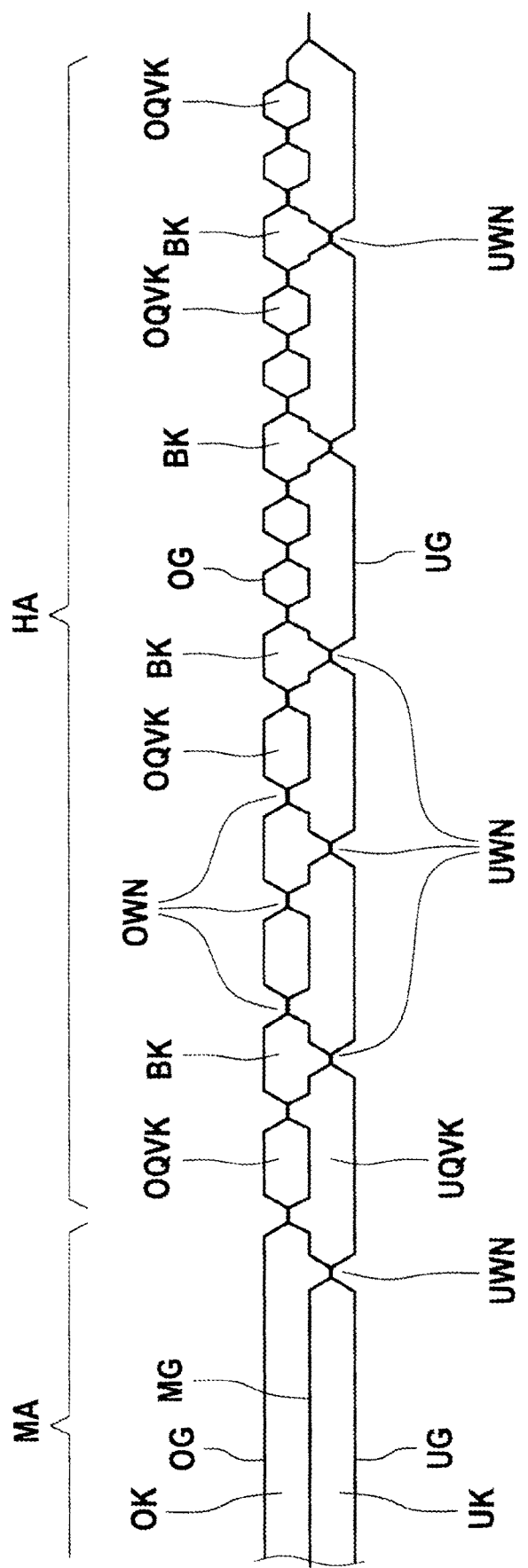

FIG. 5 shows an exemplary sectional view of a rear portion of an OPW airbag with individual chambers in the uninflated state. To illustrate the actual position of the fabric layers in relation to each other, they are shown pulled slightly apart.

Figure 6:
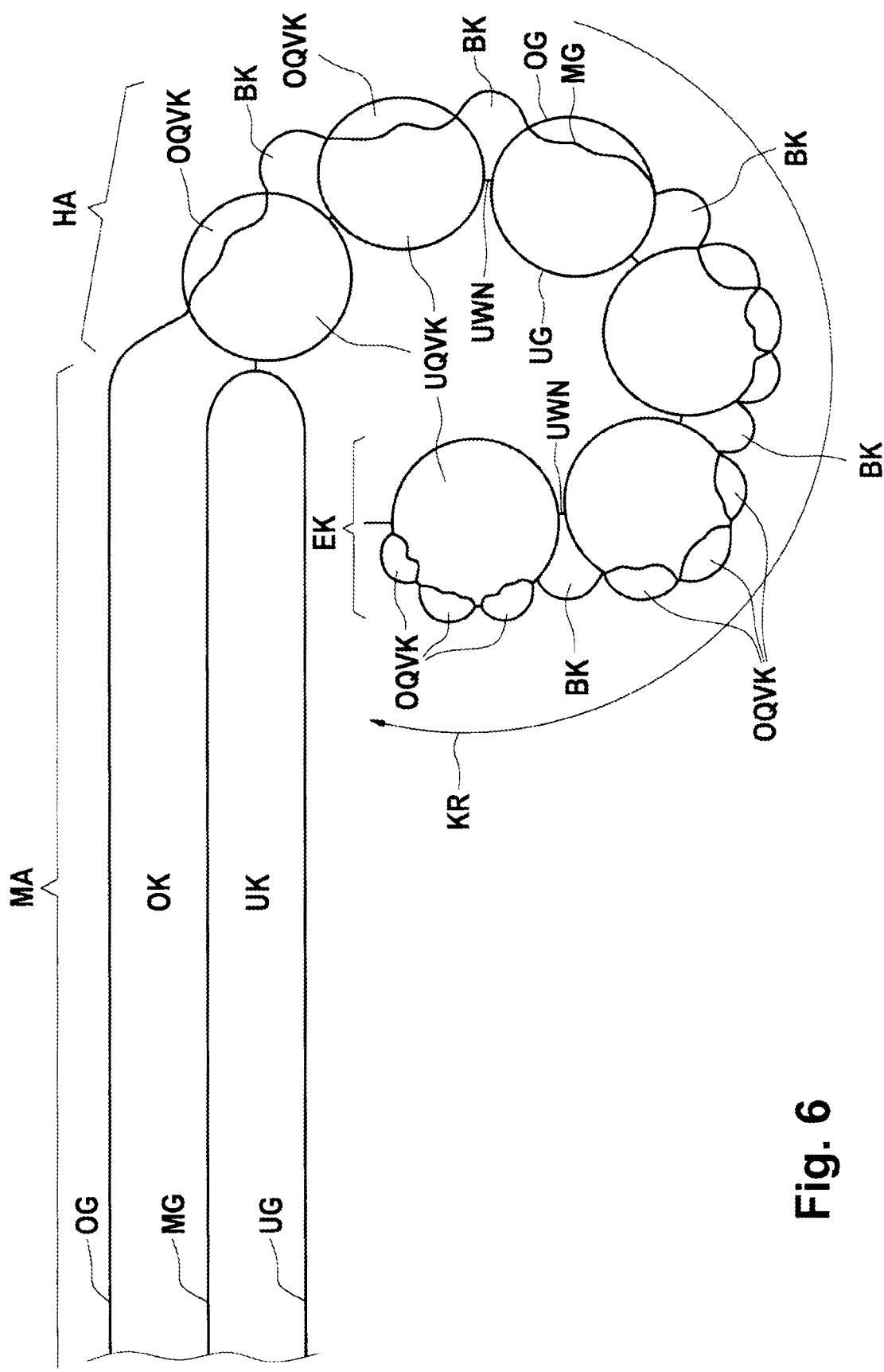

FIG. 6 shows an exemplary sectional view of the rear portion of the OPW airbag according to FIG. 5 in the inflated state, the rear portion curving in the clockwise direction and the outermost chambers abutting the main chambers of the middle portion.

Figure 7:
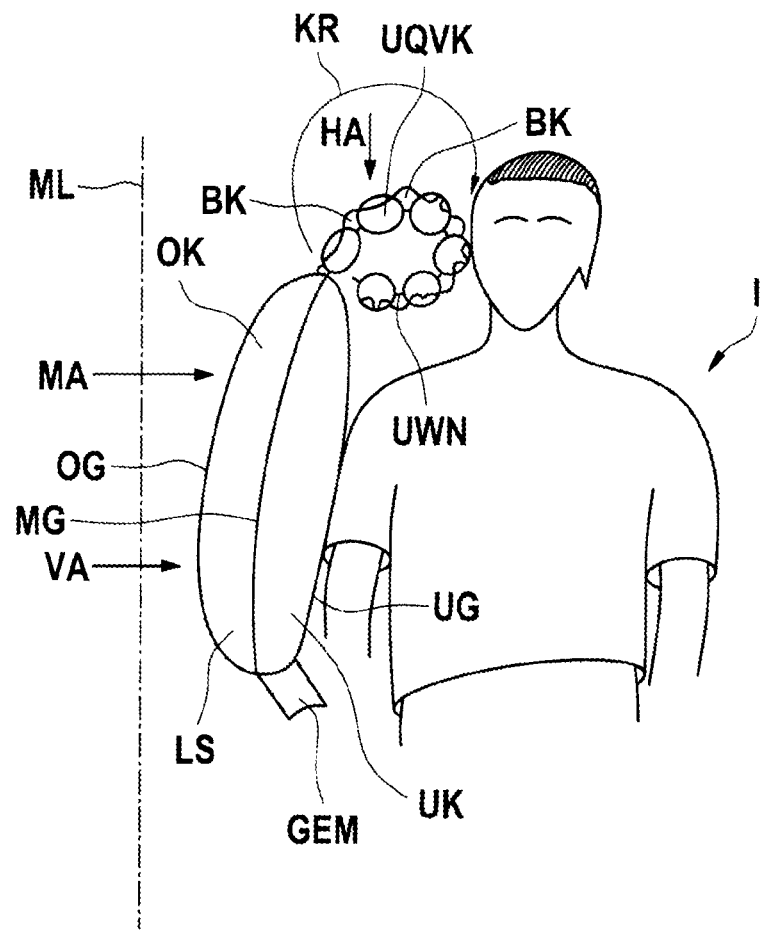

FIG. 7 shows an OPW airbag in the inflated state from the side, in contact with a vehicle occupant.

FIG. 1 shows a greatly simplified view from above of an embodiment of a lower and an middle fabric layer UG and MG of an OPW airbag LS according to the invention in the uninflated state. The OPW airbag LS is woven in one piece from warp and weft threads. The warp threads run in the warp direction according to arrow K. The weft threads run in the weft direction according to arrow S. However, the direction is not binding. They form three woven fabric layers, the lower fabric layer UG, an upper fabric layer OG and the middle fabric layer MG arranged therebetween.

The OPW airbag LS is divided into a front portion VA, a middle portion MA and a rear portion HA. The middle fabric layer MG is directed towards the viewer. The lower fabric layer UG is directed away from the viewer. In the front portion VA, there is a first partial region ETB (small diamond check pattern for illustration purposes only), in which the warp and weft threads of the middle fabric layer MG emerge therefrom. In this embodiment, the warp threads float between the lower fabric layer UG and the upper fabric layer OG. Details of this are shown in FIG. 4. The weft threads of the middle fabric layer are partially t to the upper fabric layer OG and partially to the lower fabric layer UG in the first partial region ETB. The person skilled in the art understands "tied" to mean binding into a layer (here lower fabric layer UG or upper fabric layer OG) as looping over one or a few threads of the layer. Adjoining the small diamond checked first partial region ETB of the front portion VA of the OPW airbag LS, there is a second partial region ZTB (larger diamond check pattern for illustration purposes only). The warp threads previously floating in the first partial region ETB and the tied weft threads as described above of the middle fabric layer MG enter the upper fabric layer OG or the lower fabric layer UG at the transition from the first partial region ETB to the second partial region ZTB which is configured in two layers. The second partial region ZTB is configured in two layers, i.e. it consists of only upper fabric layer OG and lower fabric layer UG (FIG. 4). The generator mouth GEM, in the region of which a generator G (not shown) is connected, is also located here.

A first plurality EVZ (extending from top to bottom in FIG. 1) of (by way of example here) seven lower woven seams UWN, drawn as thick black dashes can be seen in the rear portion HA. The middle fabric layer MG is woven together with the lower fabric layer UG in the region of these lower woven seams UWN. A lower transverse stiffening chamber UQVK is arranged in each case between two adjacent lower woven seams UWN. A lateral view of this configuration can be found in FIG. 5. In addition to the first plurality EVZ, five further first pluralities EVZ of lower woven seams UWN are shown by way of example (alongside to the right in FIG. 3) which each also enclose lower transverse stiffening chamber UQVK between them (see also FIG. 5). A single-layer region EB surrounds the OPW airbag LS as a "woven seam". The so-called woven seam results due to the fact that all warp and weft threads are brought together in this region in one fabric layer. A section line IV-IV is marked in the front portion VA. This is dealt with in the description of FIG. 4. The OPW airbag LS shown here is enclosed by an outer woven seam WNA.

FIG. 2 shows a top view of the OPW airbag according to FIG. 1, the lower fabric layer having been omitted for reasons of clarity. Here, second plurality ZVZ (extending from top to bottom in FIG. 1) of (by way of example here) thirty upper woven seams OWN, drawn as longitudinal ovals can be seen in the rear portion HA. The middle fabric layer MG is woven together with the upper fabric layer OG in the region of these upper woven seams OWN. The first three upper woven seams OWN counted from the top in FIG. 2 each enclose two upper transverse stiffening chambers OQVK. The third and fourth upper woven seam OWN enclose a bridge chamber BK. In the further course of the first plurality EVZ downwards, three upper transverse stiffening chambers OQVK are enclosed by four upper woven seams OWN which are then followed by a second bridge chamber BK (counted from the top). The pattern continues up to the middle portion MA—three upper transverse stiffening chambers OQVK being followed in each case by a bridge chamber BK—and then ends with two upper transverse stiffening chambers OQVK.

Reference should also be made to the groups of four oblong rectangles each running transversely through FIG. 2, which are used here to indicate X-tether series arranged by way of example, these groups being arranged between the upper fabric layer OG and the middle fabric layer MG and that cannot actually be seen in the current FIG. 2, as they are located between the middle fabric layer MG and the upper fabric layer OG. See also FIG. 4.

Finally, FIG. 3 illustrates the upper fabric layer OG, which is not visible in reality, and the middle layer MG lying below it to show the local correlation of the upper transverse stiffening chambers OQVK and lower transverse stiffening chambers UQVK as well as of the bridge chambers BK (see also FIG. 5).

FIG. 4 shows a schematic sectional view IV-IV from FIG. 1 in the inflated state from above, where free floating warp threads FK of the middle fabric layer MG are shown in the first partial region ETB of the OPW airbag LS. It should be noted that the three fabric layers lie close together in the uninflated state, the floating warp threads FF lying loosely between the two outer layers OG and UG.

In FIG. 4, one can see a three-layer fabric (in the drawing) coming from above, consisting of the lower fabric layer UG, the upper fabric layer OG and the middle layer MG arranged therebetween. An upper chamber OK is located between the upper fabric layer OG and the middle fabric layer MG. A lower chamber UK is located between the middle fabric layer MG and the lower fabric layer UG. The middle fabric layer MG arranged therebetween ends at the first partial region ETB and disintegrates there, as it were, in that the warp and weft threads of the middle fabric layer MG are not woven together in the first partial region ETB, they emerge from the middle fabric layer MG. The warp threads float between the lower fabric layer UG and the upper fabric layer OG, and enter the lower fabric layer UG or the upper fabric layer OG at the transition into the second partial region ZTB where they are then incorporated. A special feature of the configuration according to the invention is that the middle fabric layer MG no longer exists in the first partial region ETB and in the second partial region ZTB.

A few tether series XTK, consisting of so-called X-tethers, which in turn are formed by a mutual exchange of warp and/or weft threads into the adjoining woven layer, are indicated by way of example in the upper chamber OK. A tether series consists of a plurality of X-tethers arranged side by side in a series. The object and purpose of the X-tethers is to limit or control the swelling of the respective fabric layers during inflation. This is known to a person skilled in the art.

In the deployment case of the OPW airbag LS according to the invention, starting from the generator mouth GEM, the medium used to inflate the airbag—referred to in the following only as "inflation air" or "air"—flows out of the two-layer second partial region ZTB through the first partial region ETB, also referred to as the inflow region ESB, in which warp and weft threads float, in the direction of the middle fabric layer MG which begins after the first partial region ETB.

This inflow region ESB, which is intended to enable the air to flow in with as little resistance as possible, is required to achieve dynamic filling of the airbag LS or the two air chambers OK and UK located one above the other, without damaging them. The inflow region ESB is designed in such a way that the warp threads of the middle fabric plane MG float freely. There is therefore no interweaving of the threads at this point. In the inflow region ESB the warp threads are so to speak "loose" inside the airbag LS.

In the two-layer second partial region ZTB, in which the generator is also connected, the warp and weft threads of the middle fabric plane MG are then also incorporated into the lower fabric layer UG or into the upper fabric layer OG or are tied on the inside to the upper fabric layer OG and lower fabric layer UG optionally in equal or different proportions. The inflow region ESB forms the connecting piece so to speak between the two-layer generator mouth GEM and the chambers OK and UK of the airbag LS.

FIG. 5 shows an exemplary sectional view of a rear portion HA of an OPW airbag with individual chambers in the uninflated state. To illustrate the actual position of the fabric layers in relation to each other, they are shown pulled slightly apart. The embodiment shown here has a different number of upper and lower chambers than the embodiment described in FIGS. 1 to 3. Thus, in the rear portion HA here, six lower transverse stiffening chambers UQVK can be seen, which are separated from each other by lower woven seams UWN. In the upper "level", however, the three lower transverse stiffening chambers UQVK on the left are each only associated with one upper transverse stiffening chamber OQVK, whereas the three lower transverse stiffening chambers UQVK on the right are each associated with two upper transverse stiffening chambers OQVK. Compare this with the embodiment example according to FIGS. 1 to 3: There, three upper transverse stiffening chambers OQVK face one lower transverse stiffening chamber UQVK. Special reference should be made to the so-called bridge chambers BK which are arranged between two upper transverse stiffening chambers OQVK. It is these bridge chambers BK which, when the OPW airbag according to the invention is inflated, cause the rear portion HA to curve, as shown in detail in FIG. 6.

FIG. 6 shows the rear portion HA of the OPW airbag according to FIG. 5 in the inflated state, the rear portion HA curving in the clockwise direction according to the arrow KR and the outermost first chambers EK abutting the lower main chamber UK of the middle portion MA (almost in FIG. 6). All chambers fill when the OPW airbag LS is inflated. The bridge chambers BK urge the lower transverse stiffening chambers UQVK away from each other and rotate them about the lower woven seams UWN in such a manner that the entire rear portion HA curves in the clockwise direction, following the arrow KR, and forms a kind of cylindric shape. As the upper transverse stiffening chambers OQVK are shorter than the lower transverse stiffening chambers UQVK, these two groups support the formation of the curvature.

FIG. 7 shows the OPW airbag according to the invention in the deployment case, that is in the inflation situation. The OPW airbag LS is shown, for example, arranged with its front region VB in the pelvic area of a vehicle occupant I and inflated.

With its front portion VA and its middle portion MA, it is in contact with the arm and chest region thus protecting the vehicle occupant I. It is easy to see that the rear portion HA of the OPW airbag LS curves in the clockwise direction and forms a cylindric shape towards the head of the occupant, protectively pushing the occupant away from an implied center line ML of an imaginary vehicle or preventing the occupant from moving towards the center line or towards another vehicle occupant not shown.

LIST OF REFERENCE NUMERALS

EB Single-layer region
ESB Inflow region
ETB First partial region
EVZ First plurality
FF Floating warp threads
GEM Generator mouth
HA Rear portion
I Vehicle occupant
K Warp direction (arrow)
KF Warp thread
KR Curvature arrow
LS OPW airbag
OQVK Upper transverse stiffening chamber
MA Middle portion
MG Middle fabric layer
ML Center line
OG Upper fabric layer
OWN Upper woven seam
S Weft direction (arrow)
UG Lower fabric layer
UQVK Lower transverse stiffening chamber
UWN Lower woven seam
VA Front portion
WN Woven seam
WNA Outer woven seam
X X-tether
XTK Tether column
ZTB Second partial region
ZVZ Second plurality

The invention claimed is:

1. A one-piece woven (OPW) airbag having warp threads and weft threads, which are woven together in at least three woven fabric layers, a lower fabric layer (UG), an upper fabric layer (OG) and a middle fabric layer (MG) arranged therebetween, wherein
   a) the OPW airbag (LS), arranged along a longitudinal axis (LA), has a front portion (VA), a middle portion (MA) and a rear portion (HA),
   b) a generator mouth (GEM) for receiving a generator (G) and adjacent thereto an inflow region (ESB) are arranged in the front portion (VA),
   c) an upper main chamber (OK) and a lower main chamber (UK) are arranged in the middle portion (MA),
   d) a first plurality (EVZ) of lower stiffening chambers (UQVK), extending along the longitudinal axis (LA) and transversely thereto, is arranged in the rear portion (HA) between the middle fabric layer (MG) and the lower fabric layer (UG),
   d) a second plurality (ZVZ) of upper stiffening chambers (OQVK), extending transversely along the longitudinal axis (LA), is arranged in the rear portion (HA) between the middle fabric layer (MG) and the upper fabric layer (OG),
   f) each lower stiffening chamber (UQVK) is associated with at least one upper stiffening chamber (OQVK), being narrower compared to said lower stiffening chamber,
   g) the lower stiffening chambers (UQVK) are each spaced apart by lower woven seams (UWN),
   h) bridge chambers (BK), which cover the lower woven seams (UWN), are arranged between the middle fabric layer (MG) and the upper fabric layer (OG).

2. The OPW airbag according to claim 1, wherein three upper stiffening chambers (OQVK) are associated with one lower stiffening chamber (UQVK) in each case.

3. The OPW airbag according to claim 1, wherein further first and second pluralities of stiffening chambers (UQVK, OQVK) are arranged along the longitudinal axis (LA).

4. The OPW airbag according to claim 1, wherein X-tether series (XTK), extending transversely and/or parallel to the longitudinal axis (LA), are arranged in selected regions in the middle portion (MA), between the middle fabric layer (MG) and the upper fabric layer (OG) and/or between the middle fabric layer (MG) and the lower fabric layer (UG).

5. The OPW airbag according to claim 1, wherein at least one stiffening woven seam (WVN) extending in the direction of the longitudinal axis (LA) is arranged in the middle portion (MA), between the middle fabric layer (MG) and the upper fabric layer (OG).

6. The OPW airbag according to claim 1, wherein after inflation of the inflow region (ESB), the stiffening chambers (UQVK, OQVK), the main chambers and the bridge chambers (BK), it curves in a circular shape above the generator mouth (GEM), the bridge chambers (BK) pushing away the adjacent up-per stiffening chambers (OQVK) and the lower woven seams (UWN) acting as hinges.

7. The OPW airbag according to claim 1, wherein it is provided with a polymer layer on its outer surfaces.

8. A method for producing an OPW airbag on a jacquard loom according to claim 1, comprising the following steps:
   a) preparing warp threads for an upper, a middle and a lower fabric layer,
   b) weaving an OPW airbag in a length of material,
   c) cutting out the OPW airbag from the length of material.

\* \* \* \* \*